(12) United States Patent
Stirling

(10) Patent No.: US 10,827,733 B2
(45) Date of Patent: Nov. 10, 2020

(54) APPARATUS AND METHODS FOR A FISHING ROLLER GUIDE SYSTEM

(71) Applicant: James Stirling, Plymouth, MA (US)

(72) Inventor: James Stirling, Plymouth, MA (US)

( * ) Notice: Subject to any disclaimer, the term of this patent is extended or adjusted under 35 U.S.C. 154(b) by 0 days.

(21) Appl. No.: 16/102,257

(22) Filed: Aug. 13, 2018

(65) Prior Publication Data

US 2019/0159438 A1    May 30, 2019

Related U.S. Application Data

(60) Provisional application No. 62/591,329, filed on Nov. 28, 2017.

(51) Int. Cl.
*A01K 87/04* (2006.01)

(52) U.S. Cl.
CPC .................... *A01K 87/04* (2013.01)

(58) Field of Classification Search
CPC ....................................... A01K 87/04
USPC ............................................. 43/24
See application file for complete search history.

(56) References Cited

U.S. PATENT DOCUMENTS

| | | | | |
|---|---|---|---|---|
| 2,262,300 A * | 11/1941 | Reynolds | ............... | A01K 87/04 43/24 |
| 2,573,647 A | 10/1951 | Marke | | |
| 2,721,412 A | 10/1955 | Smiley | | |
| 2,914,882 A | 9/1956 | Marke | | |
| 2,878,608 A * | 3/1959 | O'Brien | ................ | A01K 87/04 43/24 |
| 2,878,609 A * | 3/1959 | O'Brien | ................ | A01K 87/04 43/24 |
| 3,315,400 A * | 4/1967 | Axelson | ................ | A01K 87/04 43/24 |
| 3,350,809 A * | 11/1967 | Christ | .................... | A01K 87/04 43/24 |
| 3,641,696 A * | 2/1972 | Fleischer | ............... | A01K 87/04 242/157 R |
| 3,701,571 A * | 10/1972 | Eck | ........................ | A01K 87/04 384/418 |
| 4,428,141 A * | 1/1984 | Kovalovsky | ........... | A01K 87/04 242/157 R |
| 4,445,293 A * | 5/1984 | Ohmura | ................. | A01K 87/04 43/24 |
| 4,454,676 A * | 6/1984 | Humble | ................. | A01K 87/04 242/157 R |
| D292,116 S * | 9/1987 | Ziemelis | ...................... | D22/143 |
| D349,750 S * | 8/1994 | Boo | ............................. | D22/143 |

(Continued)

FOREIGN PATENT DOCUMENTS

GB    2076271 A  * 12/1981  ............ A01K 87/04
JP    H0588261 U  * 12/1993

(Continued)

*Primary Examiner* — Darren W Ark
(74) *Attorney, Agent, or Firm* — J. Curtis Edmondson; Law Offices of J. Curtis Edmondson

(57) ABSTRACT

A three-piece flexible roller guide system that includes an integrated frame and a pair of feet having a unique combination of bushings and a through bolt system of connection mechanism. The roller guide system mounts to a fishing rod and assists in easy adaptation to stress related conditions during the fishing process, mainly brought about by the flexible connection mechanism between the frame and the pair of feet.

9 Claims, 8 Drawing Sheets

(56) References Cited

U.S. PATENT DOCUMENTS

| | | | | |
|---|---|---|---|---|
| 5,531,041 | A | * | 7/1996 | Betto ................... A01K 87/04 43/24 |
| 5,560,139 | A | * | 10/1996 | Lembree ............... A01K 87/04 43/24 |
| D439,301 | S | * | 3/2001 | Lin ............................ D22/143 |
| 6,219,954 | B1 | * | 4/2001 | Ohmura ................ A01K 87/04 43/24 |
| 6,612,065 | B1 | | 9/2003 | Blanchette et al. |
| D501,531 | S | * | 2/2005 | Lee ............................. D22/143 |
| D580,008 | S | * | 11/2008 | Lin ............................. D22/143 |
| 9,049,851 | B2 | | 6/2015 | Marshall |
| 9,456,594 | B2 | | 10/2016 | Hoffey et al. |
| 9,591,836 | B2 | * | 3/2017 | Omura .................. A01K 87/06 |
| 9,713,322 | B2 | * | 7/2017 | Yamamoto ............ A01K 87/06 |
| 2006/0090388 | A1 | * | 5/2006 | Lee ....................... A01K 87/04 43/24 |
| 2013/0097914 | A1 | * | 4/2013 | Barber .................. A01K 87/04 43/24 |

FOREIGN PATENT DOCUMENTS

| | | | | |
|---|---|---|---|---|
| JP | H0681261 | U | * | 11/1994 |
| JP | 7050928 | Y2 | * | 11/1995 |
| JP | 2005095024 | A | * | 4/2005 |
| JP | 2005102620 | A | * | 4/2005 |
| JP | 3208137 | U | * | 12/2016 ........... A01K 89/003 |
| WO | WO-2018131006 | A1 | * | 7/2018 ............. A01K 87/04 |

\* cited by examiner

APPARATUS AND METHODS FOR A FISHING ROLLER GUIDE SYSTEM

CROSS REFERENCES TO RELATED APPLICATIONS

This application claims the benefit of U.S. Provisional Patent Application No. 62/591,329, filed Nov. 28, 2017, entitled as "Three-Piece, Flexible Roller Guide System", which is incorporated herein by reference in its entirety.

FIELD

The inventive subject matter relates to flexible roller guide systems for fishing rods.

BACKGROUND

A fishing rod has line guides placed at intervals along the length of the rod to guide the line. One design criterion is to reduce the amount of friction that the line guide encounters during travel when either the rod is straight or flexed.

U.S. Pat. No. 2,573,647 (Hans) depicts a fishing rod line guide having which allows the rod to exert its natural springing action and still not foul the line. U.S. Pat. No. 2,721,412 (Smiley) illustrates a fishing line guide having a pendent loop in the shape of an inverted figure eight. U.S. Pat. No. 2,914,882 (Hans) discloses a line guide which can be readily fitted either as a tiptop or line guide, to fishing rods having a considerable range of cross-sectional areas. A rigid eye member and resilient footing members having ends which are brought down to footings adapted to be bound along both sides of the flexible rod member. U.S. Pat. No. 6,612,065 (Blanchette et al) discloses a pseudo-elastic line guide. U.S. Pat. No. 9,049,851 (Marshall) discloses a tubular line. U.S. Pat. No. 9,456,594 (Hoffey et al) discloses a modular fly fishing rod system.

Although these prior art fishing guides generally serve their purpose, they nonetheless each have limitations that affect their overall usefulness. For example, some of the fishing line guides require a constant adjustment mechanism or for replacing the component parts with newer parts because of excessive wear and tear for being operational. These efforts are cumbersome and potentially frustrating procedures that does not lend itself to being performed quickly and easily in the field. Furthermore, time spent dismantling the guide on the fishing rod, removing the fishing line, decreasing or increasing the length of the fishing rod and line and then retrying the fishing attempt significantly diminishes the greatest asset for any angler—time spent fishing.

Therefore, it would be desirable to have a portable, modular fishing guide system, which can bend, flex, move and systematically adapt in response to pressure and stress caused when a large weight object gets connected to the line threaded through the roller guide.

SUMMARY

The present inventive subject matter provides a unique roller guide system for a fishing rod, capable of flexing, bending and adapting in response to pressure and stress caused by a large weight object connected to the line threaded through the roller guide at their point of connection to the rod frame.

It is an objective to provide a roller guide mechanism operational through the use of bushings and a through bolt design providing the user the ability to prevent breakage of the roller guide feet attached to the rod frame when circumstances present enormous stress and pressure on those points.

It is also an objective of to provide a three-piece design to create a flexible roller guide system.

It is another objective to provide a flexible foot mounted between the rod frame and roller guide mechanism to create a fishing rod roller guide capable of withstanding enormous stress.

Yet another objective to provide a bushing on the feet mounted to the rod frame and roller guide mechanism to allow for flexibility and movement of said feet.

Still another objective is to provide a flexible foot mounted between the rod frame and roller guide mechanism to create a fishing rod roller guide that allows for more ease in the reeling process.

Another objective is to provide a placement of bushings on the feet mounted to the rod frame and roller guide mechanism to allow for more ease during the reeling process when there is stress or otherwise.

Another objective is to provide a flexible, three-piece design roller guide mechanism that allows for the hooking of larger fish and game without the threat of breakage.

It should be understood that the summary above is provided to introduce in simplified form a selection of examples that are further described in the detailed description. It is not meant to identify key or essential features of any claimed subject matter that may later claim priority to the present description. Furthermore, the scope of any such claimed subject matter would not be limited to implementations that solve any disadvantages noted above or contained herein.

BRIEF DESCRIPTION OF THE DRAWINGS

Many aspects of the present invention can be better understood with reference to the following drawings. The components in the drawings are not necessarily to scale, emphasis instead being placed upon clearly illustrating the principles of the present inventive subject matter. Moreover, in the drawings, like reference numerals designate corresponding parts throughout the several views.

REFERENCE CHARACTERS

Figure 1:
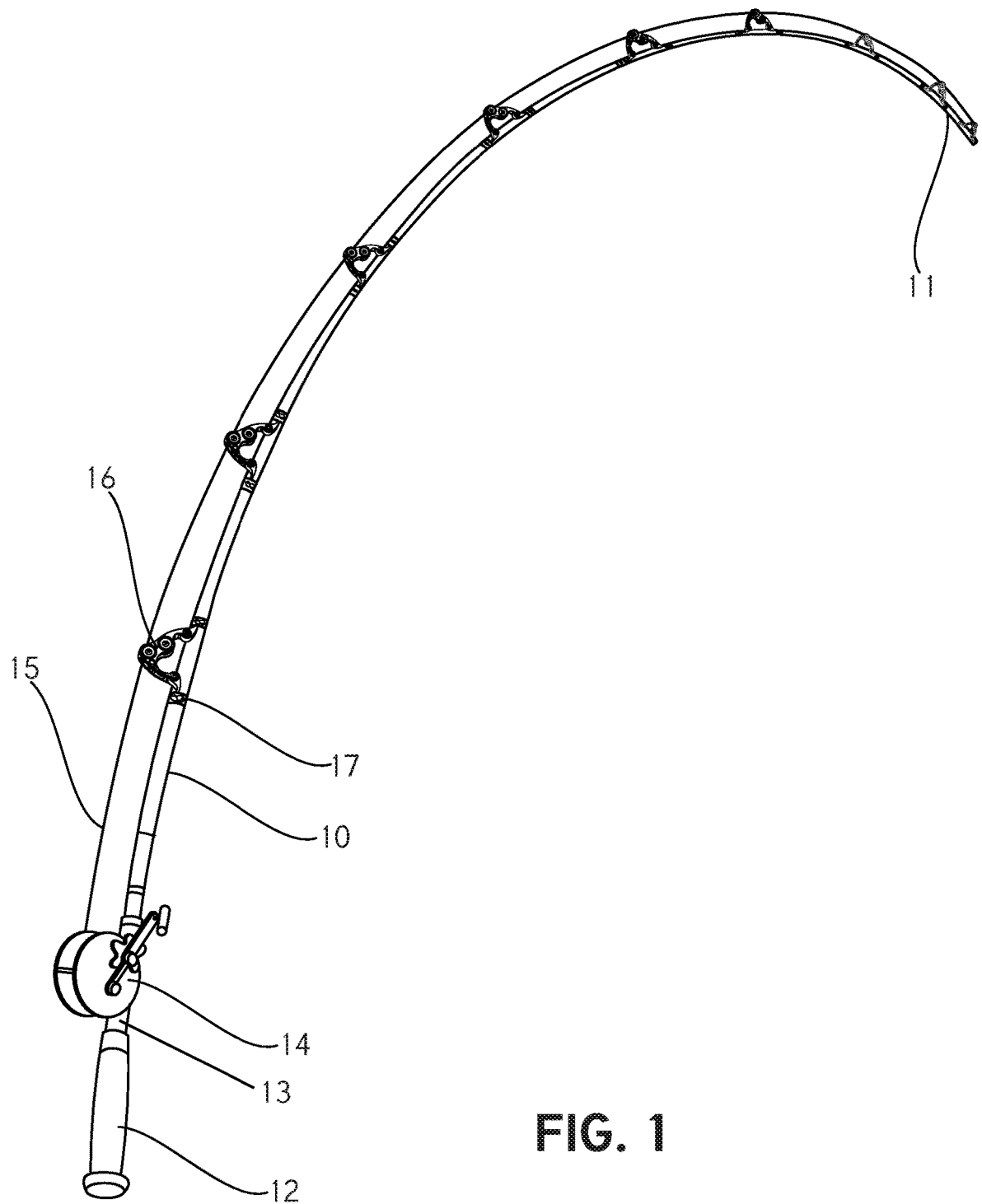
FIG. 1 illustrates a one or more flexible roller guide attached to a fishing rod.

10: Fishing rod
11: Tapered shaft
12: Handle portion
13: Reel seat
14: Reel
15: Line
16: Flexible roller guide
17: Windings
18: Metal Frame 19: Bridge
19A: Front bridge
19B: Rear bridge
19C: Top bridge
20: Main Body
20A: Front portion
20B: Rear portion
21, 21': Side flanges
22A/B: Leg segment
23A/B: Feet
24: Extension
25: Edge
26A/B: Upper part
27: Double Roller system
27A: Upper roller
27B: Lower roller
28: Stainless steel rollers
29: Side plates
30: Bushings
31: Binding bolts
32A/B: Ring frame
33: Bushings
34: Polyoxymethylene washers
35: Stainless steel through bolts

DETAILED DESCRIPTION

The embodiments in this disclosure, as illustrated in FIGS. 1 through 7 and described in the specification below, may be adapted for use as flexible roller guide for fishing rods made of different sizes and made of different material characteristics, including, but not limited to, the description below.

FIG. 1 illustrates a pictorial representation of a fishing rod attached with a flexible roller guide system according to the present inventive subject matter. The fishing rod 10 is illustrated to include a tapered shaft 11 which is commonly formed of fiberglass and synthetic bonding resin, such shaft having a handle portion 12 at the large diameter end. Provided adjacent to the handle 12 is a reel seat 13 adapted to mount a reel 14. The line 15 which is wound on the reel 14 extends first through a flexible roller line guide 16 which is mounted on the tapered shaft 11 relatively adjacent to reel seat 13.

In some embodiments, mounted at spaced points longitudinally of the remaining portion of the shaft are one or more flexible roller line guides, the distance separating such rollers from each other being such that the line will not rub against the shaft regardless of the flexed condition of the latter. The flexible roller guides are secured on to the tapered shaft 11 by nylon thread windings 17 followed by epoxy coating for better adherence. As one of ordinary skill in the art would recognize, a typical installation of roller guides to accommodate the variation in the diameter of the rod would require a largest flexible roller guide nearest to the reel to a smallest flexible roller guide nearest to the tip of the rod. Thus, various sizes of flexible roller guides are typically needed to equip a rod.

Figure 2:
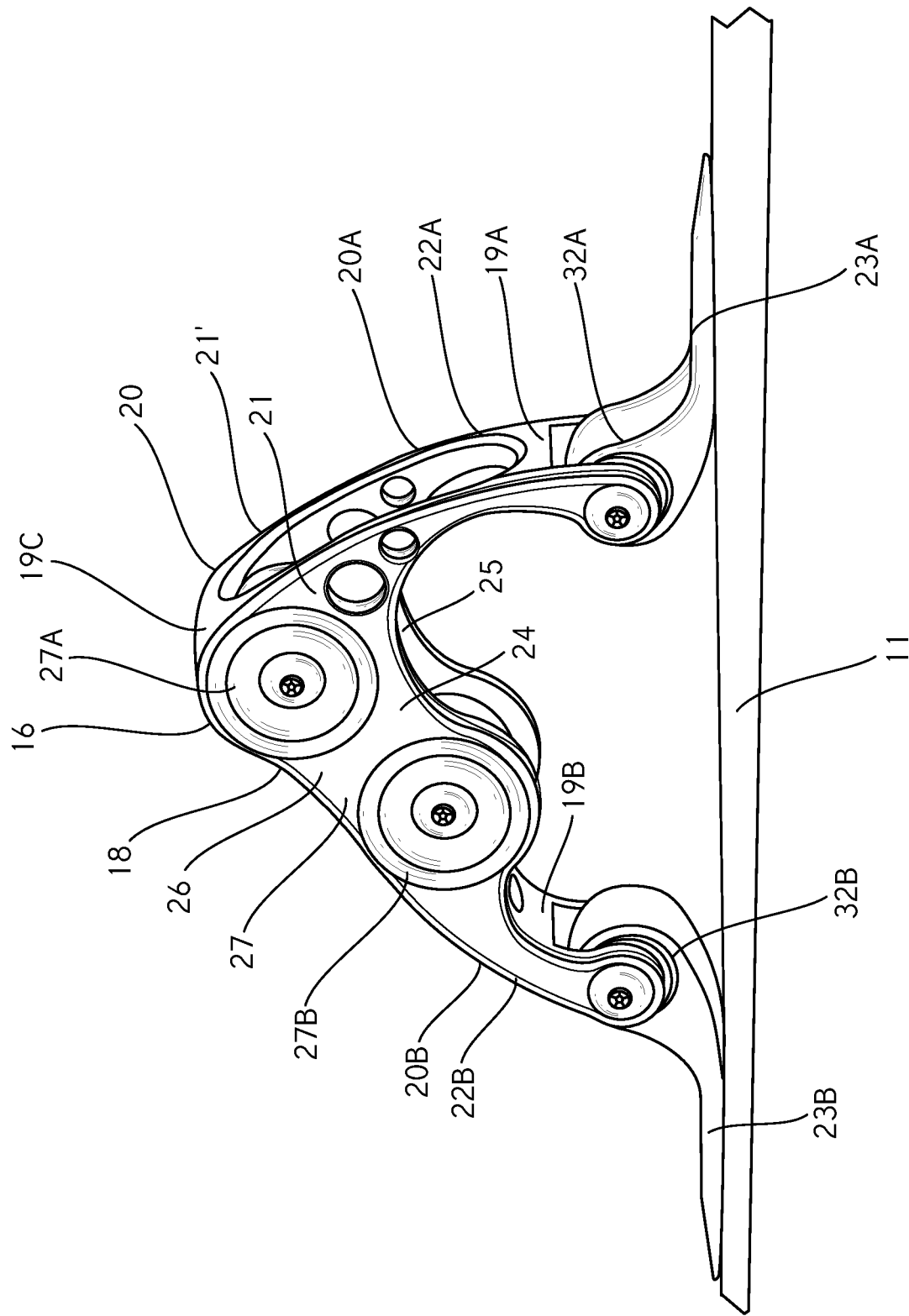
FIG. 2 illustrates an enlarged side perspective view of the flexible roller guide.

FIG. 2 describes an enlarged view of the flexible roller guide 16 according to the present inventive subject matter. A metal frame 18 has a main body 20 including a front portion 20A (normally mounted relatively facing the tip of the rod), and a rear portion 20B (normally mounted relatively facing the reel seat) between identical side flanges 21 and 21'. Additionally, the metal frame 18 is built by connecting side flanges 21 and 21' to each other through a front bridge 19A, rear bridge 19B and a top bridge 19C. The frame can be constructed from solid aluminum, titanium, brass, composite plastics, carbon fiber, Kevlar and other metals.

Feet 23A and 23B are connected via a flexible and movable connection, respectively, with a leg segment 22A of the front portion 20A of the main body 20 and leg segment 22B of the rear portion 20B of the main body 20. It is to be noted that feet 23A and 23B need not lie in a single plane, and that the frame body is disposed orthogonal to the plane of the feet 23A/B. In alternative embodiments the feet 23A and 23B lie in a single plane.

The front portion 20A of the main body 20 is shown as extending generally perpendicularly away from the adjacent portion of shaft 11, but as curving somewhat to the left as viewed in FIG. 2. The rear portion 20B of the main body 20 is illustrated as being substantially inclined relative to the adjacent shaft portion, for example at the indicated forty-five-degree (approximately) angle. The rear portion 20B of the main body 20 has an extension 24 with an edge 25, the central part of the extension 24 is generally parallel to the metal frame 18 curvature. The upper part 26 of the rear portion houses a double roller system 27, as a part of the extension 24, between the edge 25 and the frame 18. In other embodiments a single roller system may conveniently replace the double roller system 27.

The double roller system 27 includes an upper roller 27A and a lower roller 27B mounted in a linear fashion at an angle ranging between 40-50 degrees to that of the axis of the fishing rod tapered shaft 11.

The leg segment 22A of the front portion 20A is rotatably mounted within a ring frame opening 32A on the upper portion of the feet 23A. In a similar fashion a leg segment 22B of the rear portion 20B is rotatably mounted within a ring frame opening 32B on the upper portion of the feet 23B.

Figure 3:
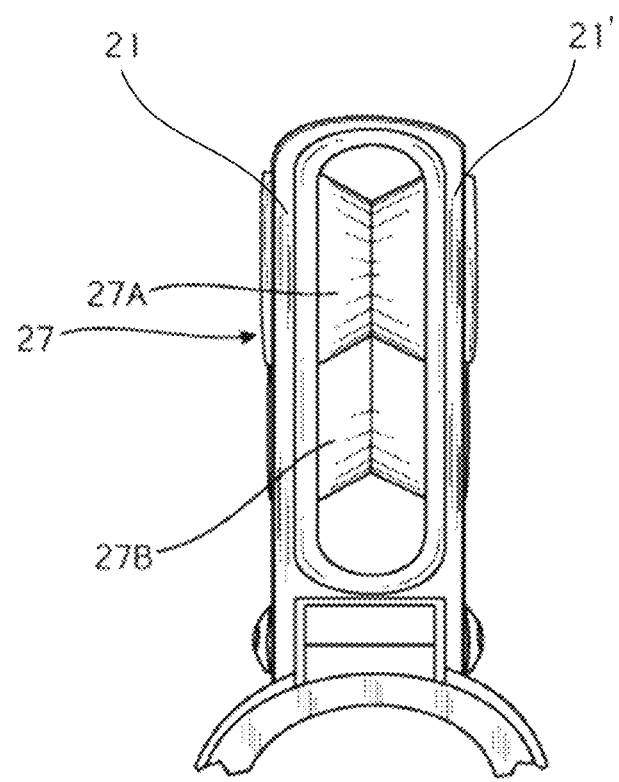
FIG. 3 illustrates an enlarged right-side view of the flexible roller guide.

FIG. 3 illustrates a right-side perspective view of the flexible roller guide 16. The line 15 is threaded between the upper roller 27A and the lower roller 27B. It will thus be observed that the line 15 is constrained against upward, downward and lateral movement through any substantial distance. Any upward movement being prevented by the upper roller 27A, any downward movement being prevented by the lower roller 27B and any lateral movement prevented by the flanges 21 and 21'. The constrained pathway for the line 15 through the roller guide 16, between the side flanges 21/21' and between the roller system 27, insures that the line 15 can never loop over a portion of the frame 19 and thus become fouled.

Figure 4:
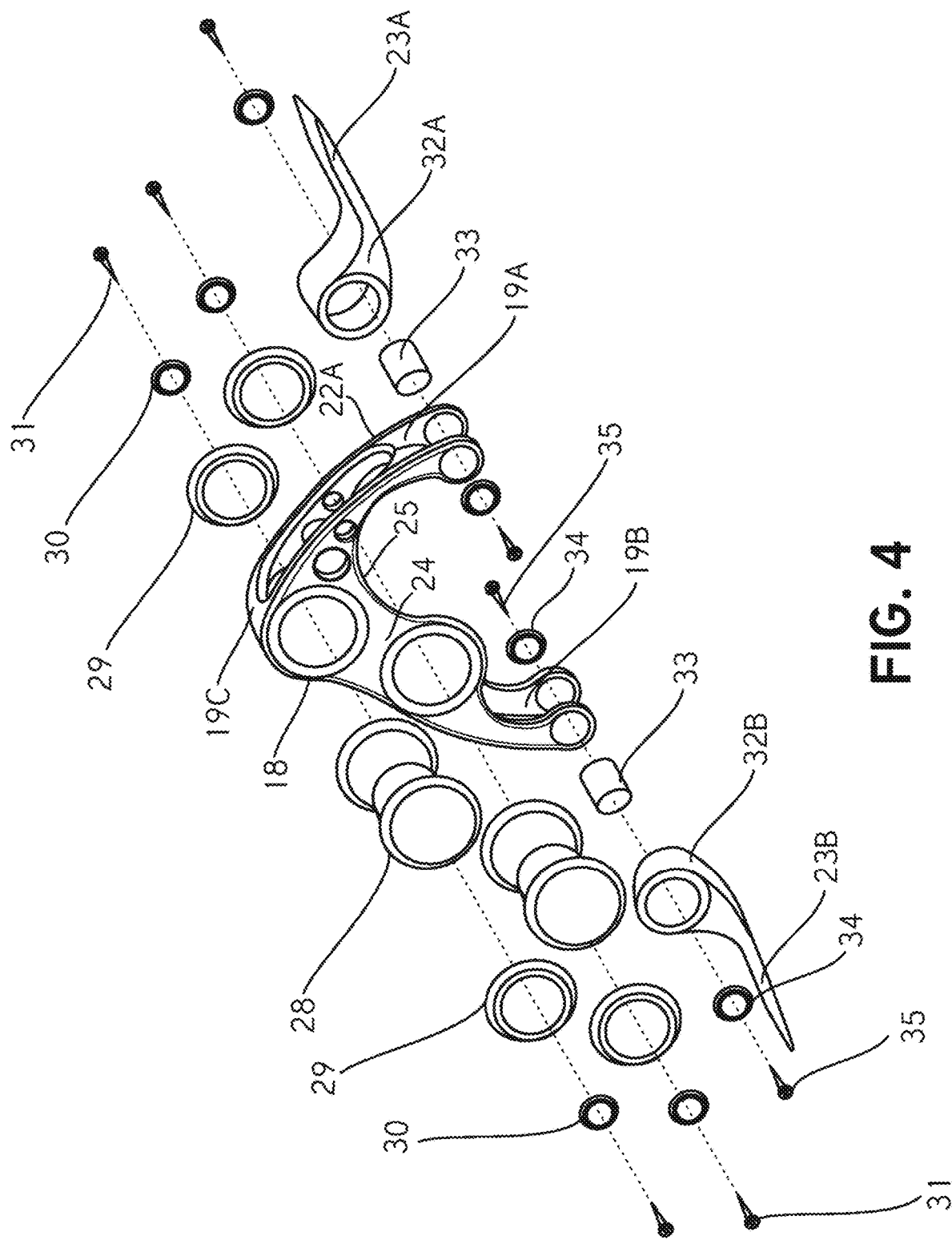
FIG. 4 illustrates an exploded view of the flexible roller guide.
Figure 5A:
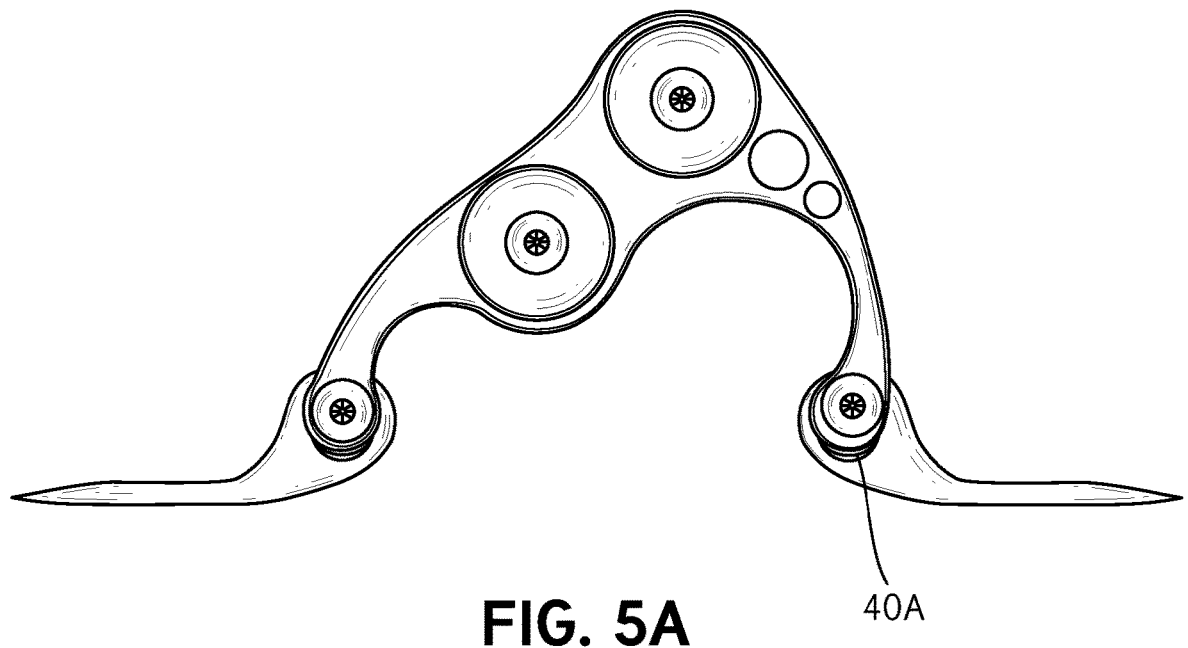
FIGS. 5A-D illustrates different positions of the flexible roller guide.
Figure 5B:
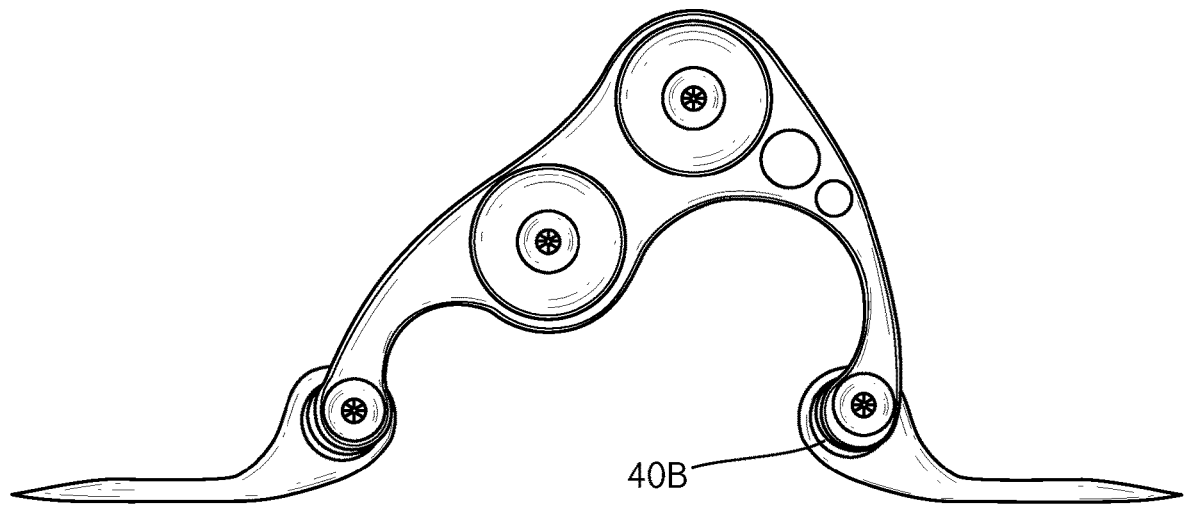
Figure 5C:
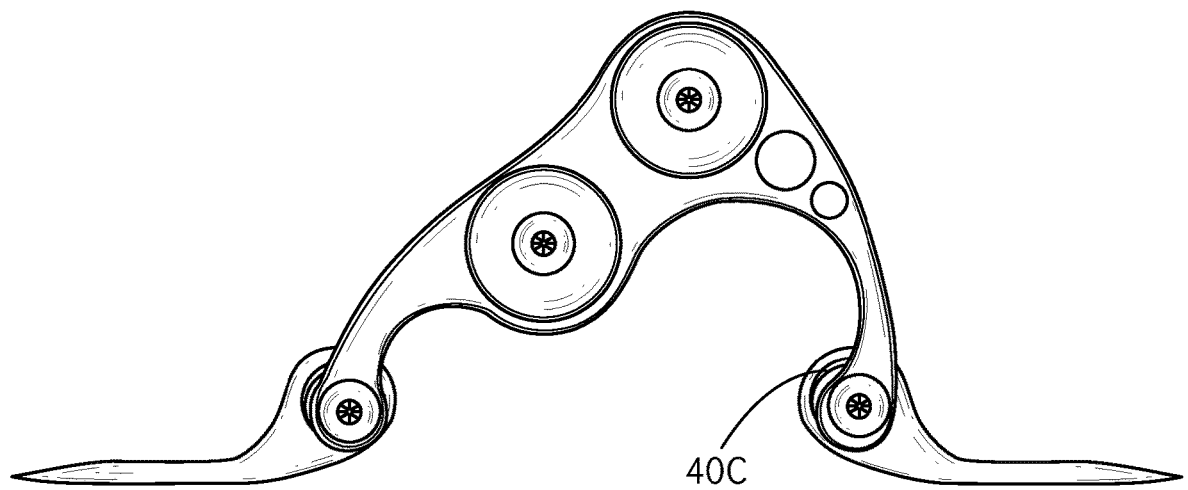
Figure 5D:
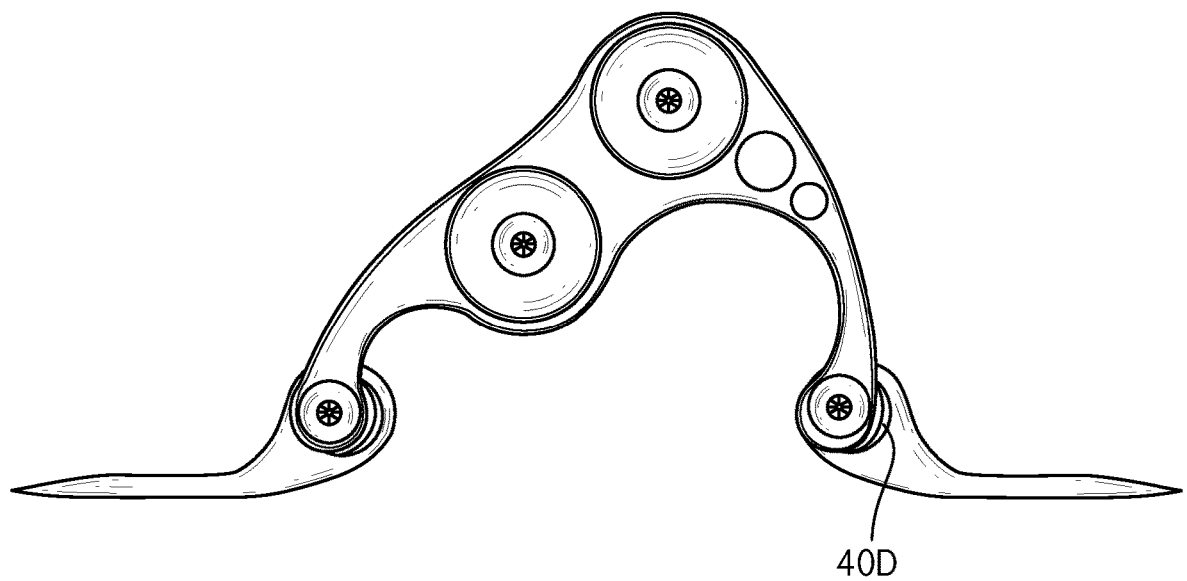

An exploded view of the flexible roller guide 16 is as illustrated in FIG. 4. The mounting structure for each of the rollers, the upper roller 27A and the lower roller 27B, includes stainless steel rollers 28, side plates 29, bushings 30 and stainless-steel binding bolts 31. These rollers typically offer less friction for a line 15 passing in-between them. The bushing 30 has three grease pockets machined around it to insure smooth turn operations. The bushings 30 are installed through the rollers to insure proper seat needed for smooth rotation. The side plates are to insure proper alignment for roller system and to insure no saltwater breakdown due to electrolysis. The stainless-steel binding bolts hold all parts together with smooth transition.

Each of the leg segment mountings includes a combination of a central bushing 33, Delrin washers 34 and stainless steel through bolts 35, which are threaded into the central bushing 33 to maintain the leg segments pressed tightly against the ends of the central bushing 33 and the ring frame opening 32A/B. The central bushing 33 has an overall oval shape and is designed to give the roller guide 16 the flex needed as it can rotate 360 degrees as well as let the guide go forward, back, up, and down all at the same time. The central bushings 33, includes but not limited to, soft bushings, semisoft bushings and semi hard bushings made from a variety of materials. The Delrin washer is designed to insure no saltwater breakdown due to electrolysis when stainless binding bolts are against aluminum. The stainless-steel binding bolts hold all parts intact.

The length of the central bushing 33 is greater than the thickness of each ring frame opening 32A/B and the diameter of the central bushing 33 is less than the diameter of the ring frame opening 32A/B, such that to provide a sufficient clearance to permit each leg segment 22A/B to rotate freely about its axis inside the ring frame opening 32A/B and to roll over the inside circumference of the ring frame opening 32A/B.

The force exerted on the roller guide, when the line is pulled through, while fishing is transferred to the feet 23A/B via the leg segment 22A/B of the roller guide 16. The roller guide 16 responds to the force by flexibly moving the leg segment in forward or backward direction by a rotatory rolling motion or a linear motion of the leg segment 22A/B over the inside circumference of the ring frame opening 32A/B in a clockwise or anticlockwise direction. As the leg segments 22A/B form an integral part of the metal frame 18, both the leg segments 22A/B move in the same direction to accommodate the stress or force on the roller guide system. The flexible feet 23A/B design allows for the movement of the fishing rod 10 and guide 16 to improve on proper parabolic bend of fishing rod 10 without the distortion from epoxy and windings 17 due to the inherent stiffness. The flexible feet 23A/B design also allows for protection of epoxy from breaking down and discoloring. The flexible feet 23A/B design assures the guide from fracture due to major bend of the fishing rod 10.

As the diameter of the central bushing 33 is less than the diameter of the ring frame 32A/B, the clockwise or anticlockwise rotatory rolling motion over the inside circumference of the ring frame brings about a circular 360-degree motion in the plane of the metal frame 18 of the flexible roller guide 16 as illustrated in FIG. 5A-D. When the metal frame 18 is adhering to the top portion of the ring frame 32A/B a gap 40A is temporarily created. Likewise, as the metal frame 18 moves in a planar circular motion with the leg segments 22A/B moving to the left, right and bottom portions of the ring frame 32A/B a gap 40B/C/D is temporarily created within ring frame 32A/B.

Figure 6:
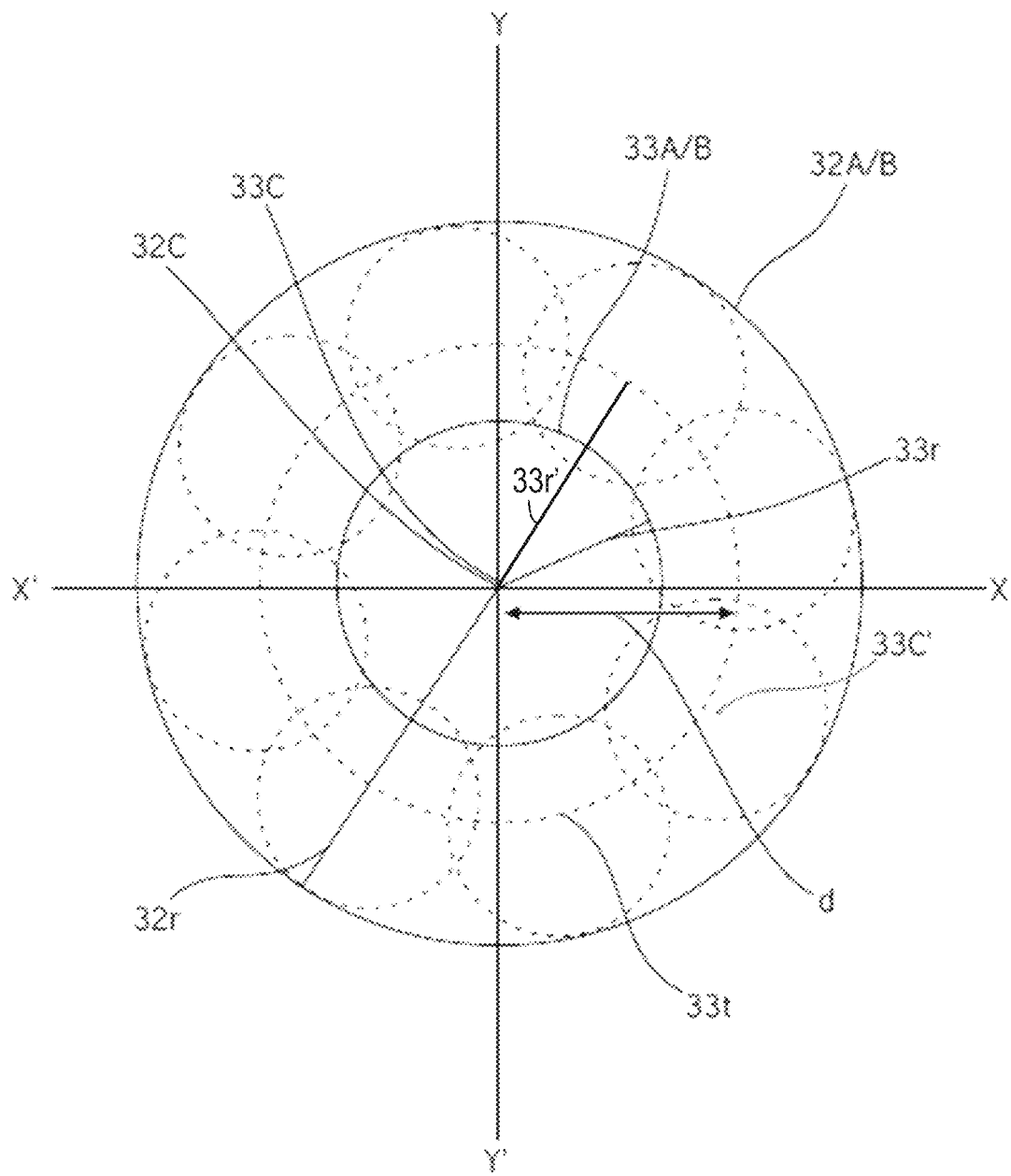
FIG. 6 illustrates range of motion for a flexible roller guide system.

A diagrammatic representation of a range of motion of the leg segments 22A/B within the ring frame 32A/B via the central bushings 33 is as illustrated in FIG. 6. Initially, the ring frame with a radius $32r$ and center $32c$ and a bushing with radius $33r$ and center $33c$, have their centers concentric. In response to the stress on the flexible roller guide 16 the leg segment moves inside the ring frame 32A/B to accommodate the stress in a circular motion or a linear motion. When the leg segment moves in a circular motion, the centers $32c$ and $33c$ or no more concentric, with the center $33c$ of the bushing traversing a distance don the X-axis. The center $33c$ now traversing a circular trajectory $33t$ with a radius $33r'$ in the X-Y and X'-Y' planes. When the leg segment moves in a linear motion, the centers $32c$ and $33c$ are no more concentric, with the center $33c$ of the bushing traversing a distance d on the X/X'/Y/Y-axis to shift to $33c'$. A bouncy property of the bushing leading to a linear motion of the bushings in the XX' or YY' or any intermediate axis.

Figure 7:
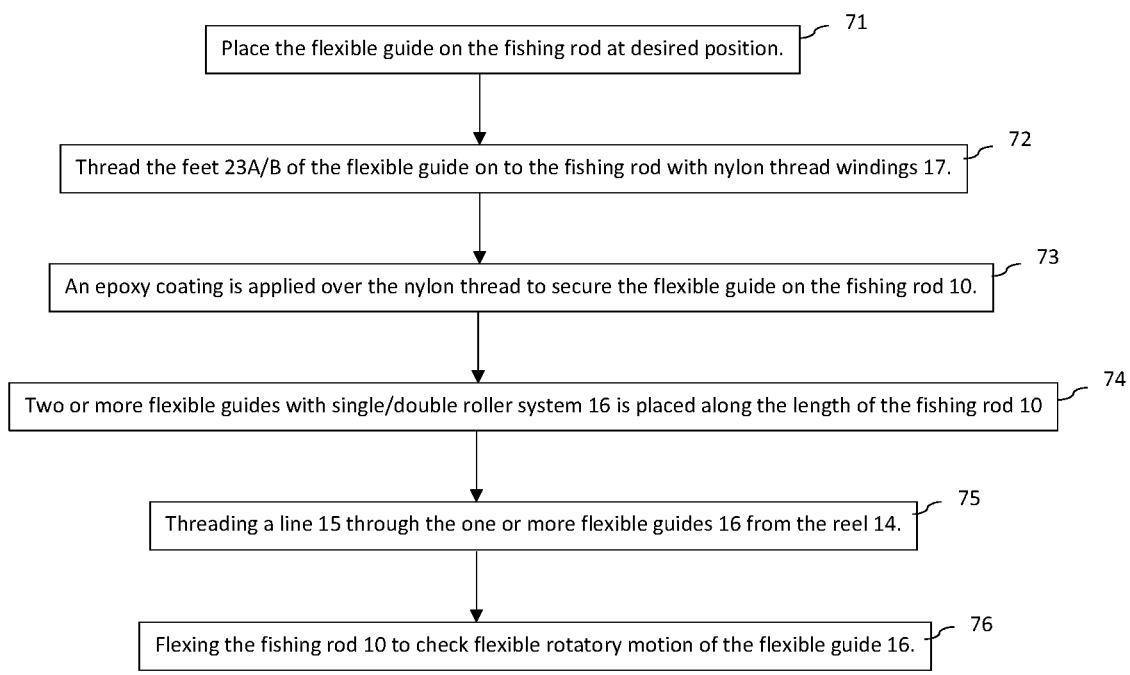
FIG. 7 illustrates flow chart for method steps.

FIG. 7 illustrates a flow chart that shows the steps to prepare the fishing rod 10 with its attached flexible roller guide 16 for fishing. Initially at step 71 the flexible roller guide is placed on the fishing rod at the desired position. At step 72, a nylon thread is used for threading (windings 17) the feet 23A/B of the flexible roller guide on to the fishing rod 10. Later at step 73, an epoxy coating over the nylon threading further secures the feet of the flexible roller guide 16 on to the fishing rod 10. Thereafter at step 74, two or more flexible roller guides with a single or double roller system is placed over the length of the fishing rod 10. At step 75, a line 15 is threaded through the one or more flexible guides. Finally, at step 76 flexing the rod to check the overall 360-degree circular rotatory motion of the metal frame of the flexible roller guide in the plane of the metal frame 18 and the main body 20. The fishing rod 10 with its attached one or more flexible roller guides 16 is now ready for using in fishing.

The many aspects and benefits of the invention are apparent from the detailed description, and thus, it is intended for the following claims to cover all such aspects and benefits of the invention which fall within the scope and spirit of the invention. In addition, because numerous modifications and variations will be obvious and readily occur to those skilled in the art, the claims should not be construed to limit the invention to the exact construction and operation illustrated and described herein. Accordingly, all suitable modifications and equivalents should be understood to fall within the scope of the invention as claimed herein.

The invention claimed is:

1. A flexible three-piece roller guide to confine a fishing line, comprising:
    a first piece of the three-piece roller guide comprising:
        a one-piece-construction frame having a first side flange and a second side flange in parallel adjacent configuration to one another and at least one bridge joining the first side flange and second side flange together, the first side flange and second side flange each symmetrically contoured;
    a second piece of the three-piece roller guide comprising:
        a first foot extending outwardly from the one-piece-construction frame on a distal front end of the frame, the first foot having a toe end mountable to a shaft of a fishing rod blank, the first foot having a hole on an end opposite the toe end; and
        a first pivot assembly comprising through bolts that are threaded through a first washer, a bushing, and a second washer, the first pivot assembly received by a first pivot opening of the first side flange on the distal front end of the frame, the hole of the first foot, and a first pivot opening of the second side flange on the distal front end of the frame; and
    a third piece of the three-piece roller guide comprising:
        a second foot extending outwardly from the one-piece-construction frame on a distal back end of the frame, the second foot having a toe end mountable to the shaft of the fishing rod blank, the second foot having a hole on an end opposite the toe end; and
        a second pivot assembly comprising through bolts that are threaded through a first washer, a bushing, and a second washer, the second pivot assembly received by a second pivot opening of the first side flange on the distal back end of the frame, the hole of second foot, and a second pivot opening of the second side flange on the distal back end of the frame.

2. The flexible three-piece roller guide to confine a fishing line of claim 1, further comprising:
    a first at least one roller receiving opening disposed transversely through the first side flange and a second at least one roller receiving opening symmetrically aligned to the first at least one roller receiving opening, the second at least one roller receiving opening disposed transversely through the second side flange, the first at least one roller receiving opening and the second at least one roller receiving opening in parallel with one another along a length of each of the first side flange and the second side flange; and at least one roller assembly comprising through bolts and bushings and a stainless steel roller, the bushings installed through the stainless steel roller, the bushings and stainless steel roller held by the through bolts, the at least one roller assembly received by the first at least one roller receiving opening of the first side flange and the second at least one roller receiving opening of the second side flange.

3. The flexible three-piece roller guide of claim 2, wherein the fishing line remains loosely confined to the roller guide under a parabolic bending of the fishing rod blank.

4. The flexible three-piece roller guide of claim 1, wherein the first pivot assembly and the second pivot assembly are each rotatable approximately 360-degrees.

5. The flexible three-piece roller guide of claim 1, wherein the first pivot assembly and the second pivot assembly are each moveable in a linear motion along an X-axis relative to the frame.

6. The flexible three-piece roller guide of claim 1, wherein the first pivot assembly and the second pivot assembly are each moveable in a linear motion along a Y-axis relative to the frame.

7. The flexible three-piece roller guide of claim 1, wherein winding of nylon thread around the toe end of each of the first foot and the second foot and the shaft secures each of the feet to the shaft of the fishing rod blank.

8. The flexible three-piece roller guide of claim 7, wherein each of the first foot and the second foot are further secured to the shaft of the fishing rod blank by an application of epoxy coating on the winding of nylon thread.

9. A roller guide to confine a fishing line, comprising:

a one-piece-construction frame having a first side flange and a second side flange in parallel adjacent configuration to one another and at least one bridge joining the first side flange and second side flange together, the first side flange and second side flange each symmetrically contoured;

a pair of feet extending outwardly from the one-piece-construction frame, a first foot of the pair of feet oppositely disposed from a second foot of the pair of feet, the first foot and the second foot each having a toe end mountable to a shaft of a fishing rod blank, the first foot and the second foot each having a hole on an end opposite the toe end;

a first at least one roller receiving opening disposed transversely through the first side flange and a second at least one roller receiving opening symmetrically aligned to the first at least one roller receiving opening, the second at least one roller receiving opening disposed transversely through the second side flange, the first at least one roller receiving opening and the second at least one roller receiving opening in parallel with one another along a length of each of the first side flange and the second side flange;

at least one roller assembly comprising binding bolts and bushings and a stainless steel roller, the bushings installed through the stainless steel roller, the bushings and stainless steel roller held by the binding bolts, the at least one roller assembly received by the first at least one roller receiving opening of the first side flange and the second at least one roller receiving opening of the second side flange;

a pair of first pivot openings each respectively disposed transversely through the first side flange and the second side flange in symmetrical alignment with one another on a distal front end of the frame;

a pair of second pivot openings each respectively disposed transversely through the first side flange and the second side flange in symmetrical alignment with one another on a distal back end of the frame; and a pair of pivot assemblies each comprising through bolts that are threaded into a first washer, a bushing, and a second washer, a first pivot assembly of the pair of pivot assemblies received by the first pivot opening of the first side flange on the distal front end of the frame, the hole of the first foot, and the first pivot opening of the second side flange on the distal front end of the frame; a second pivot assembly of the pair of pivot assemblies received by the second pivot opening of the first side flange on the distal back end of the frame, the hole of the second foot, and the second pivot opening of the second side flange on the distal back end of the frame.

* * * * *